United States Patent
Park

(10) Patent No.: US 12,416,648 B2
(45) Date of Patent: Sep. 16, 2025

(54) APPARATUS FOR CORRECTING TOLERANCE OF INDICATED SPEED, SYSTEM HAVING THE SAME, AND METHOD THEREOF

(71) Applicants: Hyundai Motor Company, Seoul (KR); Kia Corporation, Seoul (KR)

(72) Inventor: Chong Bae Park, Suwon-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 462 days.

(21) Appl. No.: 17/805,087

(22) Filed: Jun. 2, 2022

(65) Prior Publication Data

US 2023/0128325 A1    Apr. 27, 2023

(30) Foreign Application Priority Data

Oct. 22, 2021 (KR) .................. 10-2021-0141937

(51) Int. Cl.
| | |
|---|---|
| *G01P 3/80* | (2006.01) |
| *B60K 35/10* | (2024.01) |
| *B60K 35/22* | (2024.01) |
| *B60K 35/28* | (2024.01) |
| *G01S 19/52* | (2010.01) |

(52) U.S. Cl.
CPC .............. *G01P 3/80* (2013.01); *B60K 35/10* (2024.01); *B60K 35/22* (2024.01); *B60K 35/28* (2024.01); *G01S 19/52* (2013.01)

(58) Field of Classification Search
CPC ... G01P 3/80; G01P 3/44; G01P 21/02; B60K 35/00; B60K 2360/1438; B60K 2360/167; B60K 35/10; B60K 35/22; B60K 35/28; G01S 19/52; G01S 19/14; G01S 19/07; G01S 19/13; G01S 19/40; B60Y 2400/3032; B60W 40/105; B60W 2520/28; B60W 2540/18; G01C 19/02
See application file for complete search history.

(56) References Cited

U.S. PATENT DOCUMENTS

| | | | |
|---|---|---|---|
| 2006/0064240 A1* | 3/2006 | Wurth ................... | B60C 23/061 701/1 |
| 2006/0265112 A1* | 11/2006 | Hoeffel ................... | B60T 8/172 701/32.4 |
| 2012/0209505 A1* | 8/2012 | Breed ................ | G01C 21/3697 701/408 |

* cited by examiner

*Primary Examiner* — Stephen D Meier
*Assistant Examiner* — Leo T Hinze
(74) *Attorney, Agent, or Firm* — SLATER MATSIL, LLP

(57) ABSTRACT

An embodiment apparatus for correcting an indicated speed tolerance includes a global positioning system (GPS) receiver, a processor, a memory coupled to the processor and storing instructions that, when executed by the processor, cause the processor to calculate an indicated speed by using a tolerance value for each vehicle speed section of a plurality of vehicle speed sections based on a wheel speed, and to correct an error between the indicated speed and a vehicle speed by using an actual speed of a vehicle based on GPS information received from the GPS receiver, and a display device configured to display the indicated speed.

16 Claims, 7 Drawing Sheets

| VEHICLE SPEED (KPH) | TOLERANCE (EXAMPLE) | |
|---|---|---|
| | UPPER LIMIT | LOWER LIMIT |
| 0~20 | 0.70 | -1.30 |
| 21~40 | 1.00 | -1.00 |
| 41~60 | 1.30 | -0.70 |
| 61~80 | 1.60 | -0.40 |
| 81~100 | 1.90 | -0.10 |
| 101~120 | 2.20 | 0.20 |
| 121~140 | 2.50 | 0.50 |
| 141~160 | 2.80 | 0.80 |
| 161~180 | 3.10 | 1.10 |
| 181~200 | 3.40 | 1.40 |
| 201~220 | 3.70 | 1.70 |
| 221~240 | 4.00 | 2.00 |

Fig.2

| VEHICLE SPEED (KPH) | TOLERANCE (EXAMPLE) | |
|---|---|---|
| | UPPER LIMIT | LOWER LIMIT |
| 0~20 | 0.70-$\alpha$ | -1.30+$\beta$ |
| 21~40 | 1.00-$\alpha$ | -1.00+$\beta$ |
| 41~60 | 1.30-$\alpha$ | -0.70+$\beta$ |
| 61~80 | 1.60-$\alpha$ | -0.40+$\beta$ |
| 81~100 | 1.90-$\alpha$ | -0.10+$\beta$ |
| 101~120 | 2.20-$\alpha$ | 0.20+$\beta$ |
| 121~140 | 2.50-$\alpha$ | 0.50+$\beta$ |
| 141~160 | 2.80-$\alpha$ | 0.80+$\beta$ |
| 161~180 | 3.10-$\alpha$ | 1.10+$\beta$ |
| 181~200 | 3.40-$\alpha$ | 1.40+$\beta$ |
| 201~220 | 3.70-$\alpha$ | 1.70+$\beta$ |
| 221~240 | 4.00-$\alpha$ | 2.00+$\beta$ |

Fig.3

| VEHICLE SPEED Ⓐ | ACTUAL SPEED Ⓒ | INDICATED TOLERANCE Ⓔ (MIDDLE VALUE OF TOLERANCE VALUE WHEN VEHICLE IS SHIPPED) | INDICATED SPEED Ⓑ (INITIAL) | CORRECTION 1 TIME | INDICATED SPEED Ⓑ1 (CORRECTION) | CORRECTION 2 TIMES | INDICATED SPEED Ⓑ2 (CORRECTION) | ... | CORRECTION 10 TIMES | INDICATED SPEED Ⓑ10 (CORRECTION) |
|---|---|---|---|---|---|---|---|---|---|---|
| 20.00 | 18.00 | -0.30 | 19.70 | 0.09 | 19.62 | 0.08 | 19.53 | ... | 0.05357 | 19.02 |
| 40.00 | 38.00 | 0.00 | 40.00 | 0.10 | 39.90 | 0.09 | 39.81 | ... | 0.06302 | 39.20 |
| 60.00 | 58.00 | 0.30 | 60.30 | 0.12 | 60.19 | 0.11 | 60.08 | ... | 0.07248 | 59.38 |
| 80.00 | 77.00 | 0.60 | 80.60 | 0.18 | 80.42 | 0.17 | 80.25 | ... | 0.11344 | 79.16 |
| 100.00 | 97.00 | 0.90 | 100.90 | 0.20 | 100.71 | 0.19 | 100.52 | ... | 0.1229 | 99.34 |
| 120.00 | 117.00 | 1.20 | 121.20 | 0.21 | 120.99 | 0.20 | 120.79 | ... | 0.13235 | 119.51 |
| 140.00 | 136.00 | 1.50 | 141.50 | 0.28 | 141.23 | 0.26 | 140.96 | ... | 0.17332 | 139.29 |
| 160.00 | 156.00 | 1.80 | 161.80 | 0.29 | 161.51 | 0.28 | 161.23 | ... | 0.18277 | 159.47 |
| 180.00 | 176.00 | 2.10 | 182.10 | 0.31 | 181.80 | 0.29 | 181.51 | ... | 0.19223 | 179.65 |
| 200.00 | 195.00 | 2.40 | 202.40 | 0.37 | 202.03 | 0.35 | 201.68 | ... | 0.23319 | 199.43 |
| 220.00 | 215.00 | 2.70 | 222.70 | 0.39 | 222.32 | 0.37 | 221.95 | ... | 0.24265 | 219.61 |
| 240.00 | 225.00 | 3.00 | 243.00 | 0.90 | 242.10 | 0.86 | 241.25 | ... | 0.56722 | 235.78 |

Fig. 4

APPARATUS FOR CORRECTING TOLERANCE OF INDICATED SPEED, SYSTEM HAVING THE SAME, AND METHOD THEREOF

CROSS-REFERENCE TO RELATED APPLICATIONS

This application claims the benefit of Korean Patent Application No. 10-2021-0141937, filed on Oct. 22, 2021, which application is hereby incorporated herein by reference.

TECHNICAL FIELD

The present invention relates to an indicated speed tolerance apparatus, a vehicle system including the same, and a method thereof.

BACKGROUND

A cluster gauge is a display that displays vehicle information.

In particular, a speed gauge is a major information medium that informs a driver of speed information.

An indicated speed of such a cluster should be displayed higher than an actual speed to be provided to the driver. Accordingly, a manufacturer determines and manages a speed tolerance of the cluster through testing/evaluation/certification, and a difference between the indicated speed and the actual speed may be small or large depending on a vehicle type and a person in charge of testing/evaluation/certification.

For example, when the actual speed (GPS speed) is 200 km/h, the indicated speed of the cluster may be displayed as 224 km/h, and even when there is a difference between the actual speed and the indicated speed of the cluster, it is often satisfied by law. Accordingly, a growing number of consumers are complaining about a large discrepancy between the actual speed and the indicated speed of the cluster, and when a consumer performs tire tuning (changes tire inch) after the vehicle is shipped, a difference between the actual speed and the indicated speed may be larger.

The above information disclosed in this Background section is only for enhancement of understanding of the background of the invention, and therefore, it may contain information that does not form the prior art that is already known to a person of ordinary skill in the art.

SUMMARY

The present invention relates to an indicated speed tolerance apparatus, a vehicle system including the same, and a method thereof. Particular embodiments relate to a technique for minimizing an error between an indicated speed displayed on a cluster and an actual speed of a vehicle.

An exemplary embodiment of the present invention provides an indicated speed tolerance apparatus, a vehicle system including the same, and a method thereof, capable of satisfying laws and increasing user satisfaction by dynamically correcting a tolerance of a cluster indicated speed within a tolerance range that satisfies the laws.

The technical features of embodiments of the present invention are not limited to the features mentioned above, and other technical features not mentioned can be clearly understood by those skilled in the art from the description of the claims.

An exemplary embodiment of the present invention provides an indicated speed tolerance correcting apparatus including a processor configured to calculate an indicated speed by using a tolerance value for each vehicle speed section based on a wheel speed and to correct an error between the indicated speed and a vehicle speed by using an actual speed of a vehicle based on global positioning system (GPS) information, and a display device configured to display the indicated speed.

In an exemplary embodiment, it may further include a storage configured to pre-store a tolerance range for each vehicle speed section.

In an exemplary embodiment, the processor may calculate an average value of the wheel speed to determine a tolerance value in a tolerance range mapped with a speed section to which the average value of the wheel speed belongs among the vehicle speed sections.

In an exemplary embodiment, the processor may determine a tolerance value in the tolerance range based on GPS information.

In an exemplary embodiment, the processor may vary the tolerance range depending on a vehicle condition or a road type.

In an exemplary embodiment, the processor may calculate a correction value by using an actual speed calculated based on GPS information that is received in a straight state and in a horizontal state of a vehicle.

In an exemplary embodiment, the processor may collect steering angle information and vehicle attitude information to determine the straight state and the horizontal state of the vehicle.

In an exemplary embodiment, the processor may calculate the correction value by dividing a value obtained by subtracting a current actual speed of the vehicle from a previous indicated speed by a vehicle speed section value of the tolerance range for each vehicle speed section.

In an exemplary embodiment, the processor may calculate a current tolerance value by subtracting the correction value from a previous tolerance value.

In an exemplary embodiment, the processor may calculate the indicated speed by adding the current tolerance value to a current vehicle speed.

In an exemplary embodiment, the processor may correct the indicated speed to approximate the actual speed.

In an exemplary embodiment, the processor may correct the indicated speed more than a predetermined number of times to approximate the actual speed.

In an exemplary embodiment, the display device may include a cluster.

In an exemplary embodiment, the processor may correct the indicated speed more than a predetermined number of times to approximate the actual speed.

An exemplary embodiment of the present invention provides a vehicle system including a wheel speed sensor configured to sense a wheel speed of a vehicle, a GPS receiver configured to receive GPS information, and an integrated speed tolerance correcting apparatus configured to calculate the indicated speed using the tolerance value for each vehicle speed section based on the wheel speed, and to correct an error between the indicated speed and the vehicle speed by using an actual speed of the vehicle based on the GPS information.

In an exemplary embodiment, it may further include a steering angle sensor configured to sense information related to whether the vehicle travels straight ahead and a gyro sensor configured to sense attitude information of the vehicle.

An exemplary embodiment of the present invention provides an indicated speed tolerance correcting method including sensing a wheel speed of a vehicle, receiving GPS information, calculating an indicated speed by using a tolerance value for each vehicle speed section based on the wheel speed, and correcting an error between the indicated speed and the vehicle speed by using an actual speed of the vehicle based on the GPS information.

In an exemplary embodiment, it may further include pre-storing a tolerance range for each vehicle speed section.

In an exemplary embodiment, the calculating of the indicated speed may include calculating an average value of the wheel speed to determine a tolerance value in a tolerance range mapped with a speed section to which the average value of the wheel speed belongs among the vehicle speed sections.

In an exemplary embodiment, the correcting of the error between the indicated speed and the vehicle speed may include calculating a correction value by using an actual speed calculated based on GPS information that is received in a straight state and in a horizontal state of a vehicle.

In an exemplary embodiment, the correcting of the error between the indicated speed and the vehicle speed may include calculating a correction value by dividing a value obtained by subtracting a current actual speed of the vehicle from a previous indicated speed by a vehicle speed section value of the tolerance range for each vehicle speed section, calculating a current tolerance value by subtracting the correction value from a previous tolerance value, and calculating the indicated speed by adding the current tolerance value to a current vehicle speed.

According to the present technique, it is possible to satisfy laws and increase user satisfaction by dynamically correcting a tolerance of a cluster indicated speed within a tolerance range that satisfies the laws.

In addition, various effects that can be directly or indirectly identified through this document may be provided.

BRIEF DESCRIPTION OF THE DRAWINGS

FIG. 2 illustrates an example of a table showing indicated speed tolerances on a highway according to an exemplary embodiment of the present invention.

FIG. 3 illustrates an example of a table showing indicated speed tolerances on a road other than a highway according to an exemplary embodiment of the present invention.

FIG. 4 illustrates an example of a table in which the indicated speed is corrected according to an exemplary embodiment of the present invention.

DETAILED DESCRIPTION OF ILLUSTRATIVE EMBODIMENTS

Figure 1:
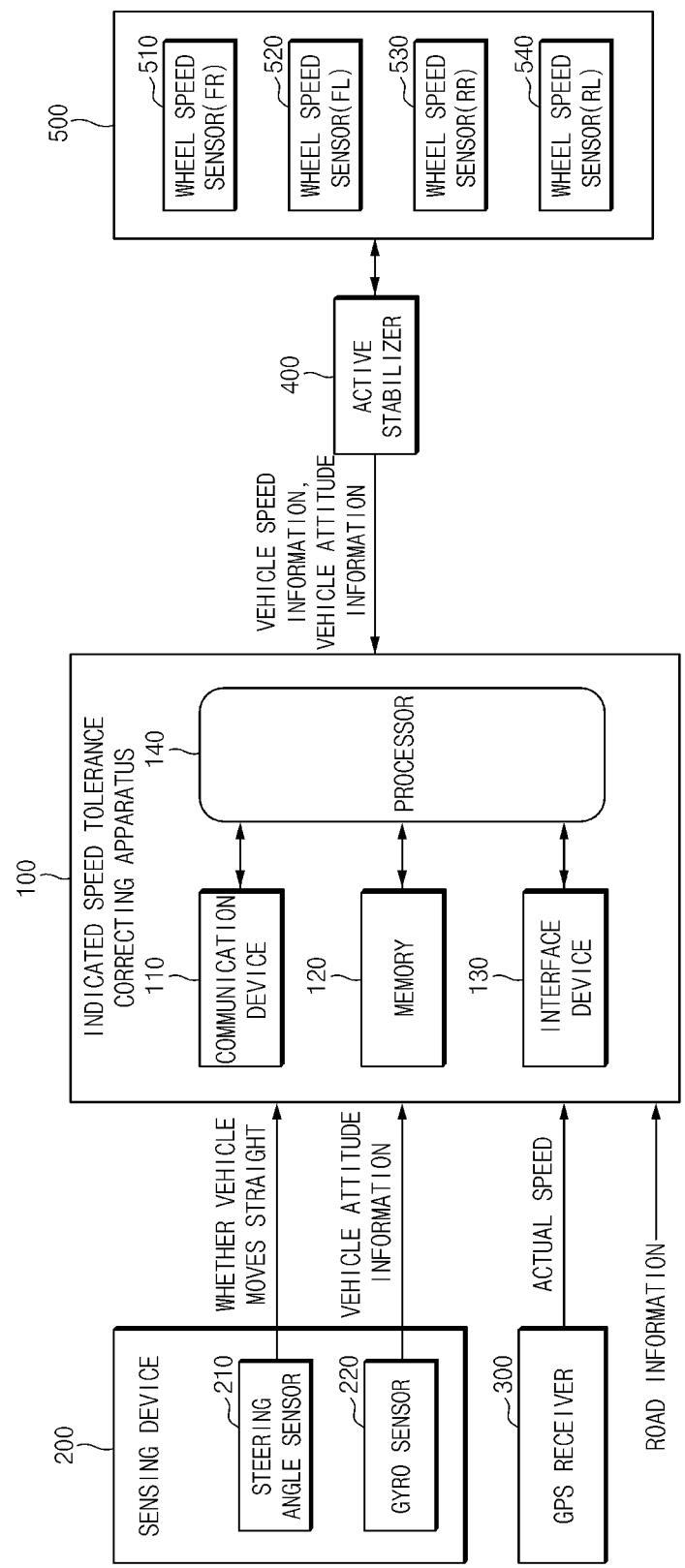
FIG. 1 illustrates a block diagram showing a configuration of a vehicle system including an indicated speed tolerance correcting apparatus according to an exemplary embodiment of the present invention.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to an exemplary embodiment of the present invention, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present invention will be described in detail with reference to FIG. 1 to FIG. 7.

FIG. 1 illustrates a configuration of a vehicle system including an indicated speed tolerance correcting apparatus according to an exemplary embodiment of the present invention.

Referring to FIG. 1, the vehicle system according to this exemplary embodiment of the present invention may include an indicated speed tolerance correcting apparatus 100, a sensing device 200, a global positioning system (GPS) receiver 300, an active stabilizer 400, and a wheel speed sensor 500.

A cluster gauge displays vehicle information particularly speed information. In this case, according to the law, an indicated speed displayed on the cluster gauge should be displayed higher than an actual speed of the vehicle, and provided to a driver. Accordingly, a manufacturer determines and manages a speed tolerance, which is a difference between the indicated speed and the actual speed for each vehicle type, through testing, evaluation, and certification in advance. However, after a vehicle is shipped, the speed tolerance may change due to a customer's tire tuning (e.g., tire inch change), tire condition change (e.g., size change and wear due to air pressure), etc., and thus it is necessary to manage the speed tolerance depending on combinations of engine types and tire types. However, it can be costly and time-consuming to evaluate the tolerances for all combinations of engines and tires of vehicle models. For example, assuming that 3 types of engines (gasoline/diesel/LPI) and 3 types of tires (16-inch/17-inch/18-inch) are applied in one vehicle model, 9 test vehicles are required for testing and evaluation of speed tolerances. Accordingly, the indicated speed tolerance correcting apparatus 100 of embodiments of the present invention may correct a tolerance based on an algorithm within a tolerance section satisfying the law.

The indicated speed tolerance correcting apparatus 100 according to the exemplary embodiments of the present invention may be implemented inside a vehicle. In this case, the indicated speed tolerance correcting apparatus 100 may be integrally formed with internal control units of the vehicle, or may be implemented as a separate device to be connected to control units of the vehicle by a separate connection means.

The indicated speed tolerance correcting apparatus 100 may calculate the indicated speed by using a tolerance value for each vehicle speed section based on wheel speed, and in this case, may correct an error between the indicated speed and the vehicle speed by using an actual speed of the vehicle based on GPS information.

Referring to FIG. 1, the indicated speed tolerance correcting apparatus 100 may include a communication device no, a memory (i.e., a storage or storage memory) 120, an interface device 130, and a processor 140.

The communication device no is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, Ethernet communication, and the like.

In addition, the communication device no may perform communication by using a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world interoperability for microwave access (WiMAX), etc. In addition, a short-range communication technique may include Bluetooth, ZigBee, ultra-wideband (UWB), radio frequency identification (RFID), infrared data association (IrDA), and the like. For example, the communication device 110 may communicate with another vehicle to transmit or receive a correction value, and may be implemented as a connectivity service unit. The connectivity service unit acquires vehicle information of an equivalent vehicle and a same trim, and allows vehicles to share the correction value of a same vehicle type.

The memory 120 may store sensing results of the sensing device 200 and data and/or algorithms required for the processor 140 to operate, and the like.

As an example, the memory 120 may store an actual speed based on GPS information, a vehicle speed (wheel speed) by a wheel speed sensor, an indicated speed calculated by the processor 140, a compensation value, a compensation value table, and the like. As an example, the memory 120 may store a table in which a tolerance range for each vehicle speed section as shown in FIG. 2 and FIG. 3 is set in advance by an experimental value.

The memory 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. Herein, the input means may include a key button, and may further include a mouse, a joystick, a jog shuttle, a stylus pen, and the like. In addition, the input means may further include a soft key implemented on the display.

The interface device 130 may be implemented as a head-up display (HUD), a cluster, an audio video navigation (AVN), a human machine interface (HMI), a user setting menu (USM), or the like, and may include any device capable of displaying an indicated speed.

The output means may include a display, and may further include a voice output means such as a speaker. In this case, when a touch sensor formed of a touch film, a touch sheet, or a touch pad is provided on the display, the display may operate as a touch screen, and may be implemented in a form in which an input device and an output device are integrated.

In this case, the display may include at least one of a liquid crystal display (LCD), a thin film transistor liquid crystal display (TFT LCD), an organic light emitting diode display (OLED display), a flexible display, a field emission display (FED), or a 3D display.

The processor 140 may be electrically connected to the communication device 110, the memory 120, the interface device 130, and the like, may electrically control each component, and may be an electrical circuit that executes software commands, thereby performing various data processing and calculations described below.

The processor 140 may process a signal transferred between components of the indicated speed tolerance correcting apparatus 100, and may perform overall control such that each of the components can perform its function normally.

The processor 140 may be implemented in the form of hardware, software, or a combination of hardware and software, or may be implemented as a microprocessor, and may be, e.g., an electronic control unit (ECU), a micro controller unit (MCU), or other sub-controllers mounted in the vehicle.

The processor 140 may calculate the indicated speed using the tolerance value for each vehicle speed section based on a wheel speed, and in this case, may correct the error between the indicated speed and the vehicle speed by using the actual speed of the vehicle based on GPS information.

The processor 140 may calculate an average value of the wheel speed to determine a tolerance value in a tolerance range mapped with a speed section to which the average value of the wheel speed belongs among the vehicle speed sections.

The processor 140 may determine the tolerance value in the tolerance range based on GPS information. For example, in the tolerance value table shown in FIG. 2 and FIG. 3, a value closer to the GPS information among a lower limit and an upper limit of the tolerance range for each vehicle speed section may be determined as the tolerance value.

The processor 140 may vary the tolerance range depending on a vehicle condition or a road type.

For example, the tolerance range for each vehicle speed section may be determined depending on a vehicle type, and the tolerance range for each vehicle speed section may be determined in advance according to the road type (e.g., a highway, an exclusive road for automobiles, a general road, etc.).

The processor 140 may calculate a compensation value by using the actual speed calculated based on GPS information received in a straight state and in a horizontal state of the vehicle.

The processor 140 may collect steering angle information and vehicle attitude information to determine the straight state and the horizontal state of the vehicle.

The processor 140 may calculate a correction value by dividing a value obtained by subtracting a current actual speed of the vehicle from the previous indicated speed by a vehicle speed section value of the tolerance range for each vehicle speed section.

The processor 140 may calculate a current tolerance value by subtracting the correction value from a previous tolerance value.

The processor 140 may calculate the indicated speed by adding the current tolerance value to the current vehicle speed, to correct the indicated speed to approximate the actual speed.

The processor 140 may perform correction more than a predetermined number of times such that the indicated speed approaches the actual speed. For example, 10 corrections may be performed, and a number of times may be predetermined by experiment values.

The sensing device 200 includes a steering angle sensor 210 and a gyro sensor 220.

The steering angle sensor 210 senses a steering angle of the vehicle to provide it to the indicated speed tolerance correcting apparatus 100.

The gyro sensor 220 provides vehicle attitude information, i.e., yaw, roll, and pitch values of the vehicle to the indicated speed tolerance correcting apparatus 100.

The GPS receiver 300 receives GPS information from the GPS and provides it to the indicated speed tolerance correcting apparatus 100. Although the GPS receiver 300 is implemented to be included in the vehicle in FIG. 1, the actual speed may be obtained by using GPS information of a user mobile communication terminal.

The active stabilizer 400 receives wheel speed information from the wheel speed sensor 500 and provides it to the indicated speed tolerance correcting apparatus 100. The active stabilizer 400 provides the yaw, roll, and pitch values of the vehicle to the indicated speed tolerance correcting apparatus 100.

The active stabilizer 400 may include an anti-lock brake system (ABS), an electronic stability control (ESC), or the like.

The wheel speed sensor 500 includes wheel speed sensors 510, 520, 530, and 540 that are respectively provided for four wheels of the vehicle, to sense wheel speeds by using a magnetic sensor, and provides wheel speed information to the indicated speed tolerance correcting apparatus 100. However, the indicated speed tolerance correcting apparatus 100 obtains the vehicle speed based on wheel speed information, and in this case, after the vehicle is shipped out, it becomes difficult to accurately measure the vehicle speed because a dynamic load radius of a tire is changed due to tire tuning, or the tire condition is changed due to a change in size or wear due to air pressure. Accordingly, according to embodiments of the present invention, the difference between the indicated speed and the actual speed may be minimized by calculating a correction value on a basis of the actual speed based on GPS information and correcting the indicated speed.

As such, according to embodiments of the present invention, when the vehicle is shipped, the indicated speed of the cluster gauge is fixed as a reference value, but after the vehicle is shipped out, the indicated speed may be corrected depending on road information, a vehicle tire condition (tire inch change), a vehicle condition (vehicle engine output), and the like.

FIG. 2 illustrates an example of a table showing indicated speed tolerances on a highway according to an exemplary embodiment of the present invention, and FIG. 3 illustrates an example of a table showing indicated speed tolerances on a road other than a highway according to an exemplary embodiment of the present invention.

The indicated speed tolerance correcting apparatus 100 may obtain navigation information (road information), and may select and map a tolerance section for each road type. FIG. 2 illustrates an example of a tolerance section in the case of a highway, and FIG. 3 illustrates an example of a tolerance section in the case of a general road other than a highway.

The indicated speed tolerance correcting apparatus 100 may minimize and set the tolerance section such that a cluster indicated speed, which is an input value, is mapped to the actual speed as quickly as possible for technological advancement.

FIG. 4 illustrates an example of a table in which the indicated speed is corrected according to an exemplary embodiment of the present invention.

The indicated speed tolerance correcting apparatus 100 may calculate a correction value by using a vehicle speed, a currently displayed indicated speed, and a reliable actual speed as shown in Equation 1 below.

$$ⓓ^n = (ⓑ^{n-1} - ⓒ)/(\text{speed section}) \qquad \text{Equation 1}$$

In this case, ⓐ indicates the vehicle speed, ⓑ$^{n-1}$ indicates the currently displayed indicated speed, ⓒ indicates the reliable actual speed, and ⓓ$^n$ indicates the correction value. The speed section indicates a section range of the vehicle speed, and the speed section is 20 in FIG. 4.

The indicated speed tolerance correcting apparatus boo may calculate a current tolerance value below by using a previous tolerance value (previous indicated tolerance) and the correction value as shown in Equation 2.

$$ⓝ n = ⓔ n-1 - ⓓ n \qquad \text{Equation 2}$$

Herein, ⓔ$^n$ indicates the current tolerance value, ⓔ$^{n-1}$ indicates the previous tolerance value, and ⓓ$^n$ indicates the current correction value.

The indicated speed tolerance correcting apparatus 100 may calculate the corrected indicated speed by using the vehicle speed and the current tolerance value as shown in Equation 3.

$$ⓑ^n = ⓒ + ⓔ^n \qquad \text{Equation 3}$$

Herein, ⓑn indicates the corrected indicated speed.

Figure 5:
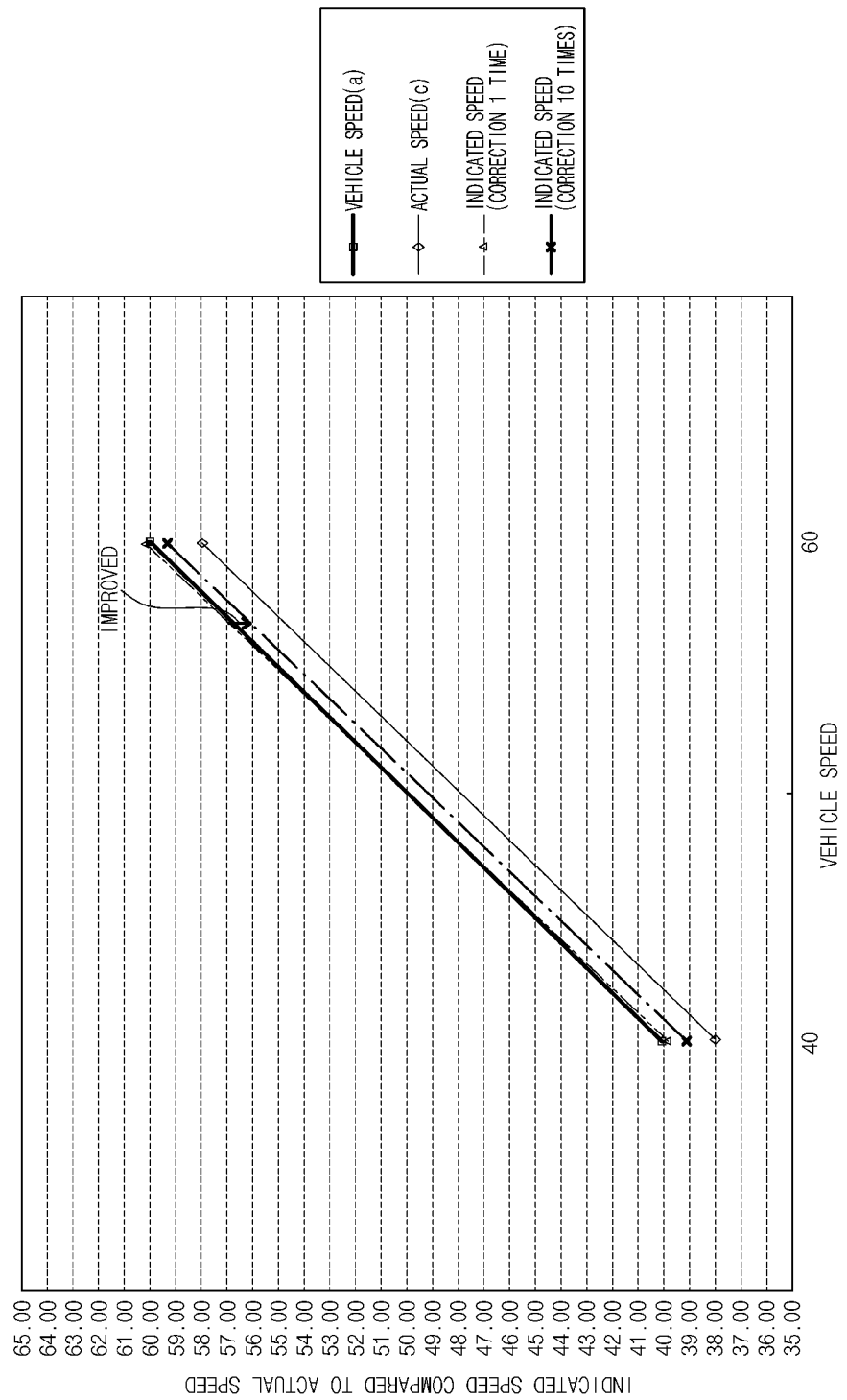
FIG. 5 illustrates a graph simulating correction of an indicated speed according to an exemplary embodiment of the present invention.

FIG. 5 illustrates a graph simulating correction of an indicated speed according to an exemplary embodiment of the present invention. FIG. 5 illustrates a graph simulating whether the indicated speed converges to the actual speed, assuming that the vehicle speed is a same value for 10 times for each speed. Referring to FIG. 5, it can be seen that the indicated speed is close to the vehicle speed when the correction is performed once, but the indicated speed is close to the actual speed when the correction is performed 10 times.

Figure 6:
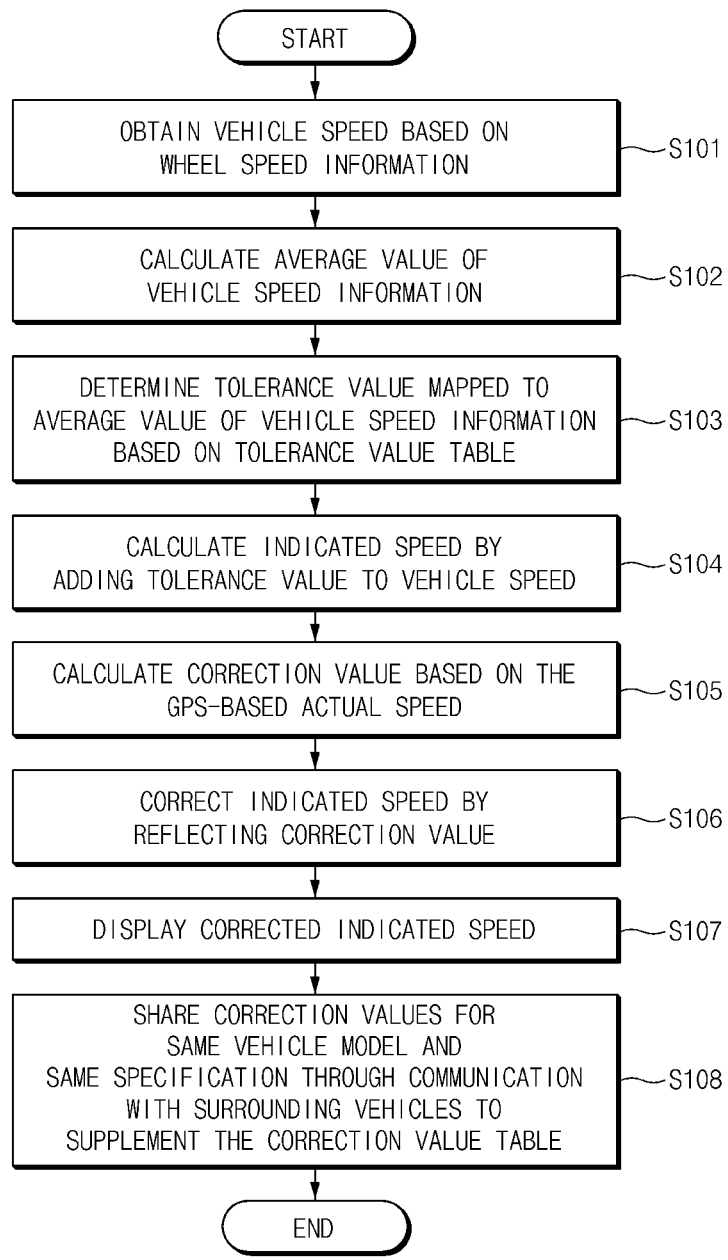
FIG. 6 illustrates a flowchart showing a method for correcting a tolerance of a cluster indicated speed according to an exemplary embodiment of the present invention.

Hereinafter, an indicated speed tolerance correcting method according to an exemplary embodiment of the present invention will be described in detail with reference to FIG. 6. FIG. 6 illustrates a flowchart showing a method for correcting a tolerance of an indicated speed according to an exemplary embodiment of the present invention.

Hereinafter, it is assumed that the indicated speed tolerance correcting apparatus 100 of FIG. 1 performs the processes of FIG. 6. In addition, in the description of FIG. 6, operations described as being performed by a device may be understood as being controlled by the processor 140 of the indicated speed tolerance correcting apparatus 100.

Referring to FIG. 6, the indicated speed tolerance correcting apparatus 100 obtains a vehicle speed based on wheel speed information (S101).

The indicated speed tolerance correcting apparatus 100 calculates an average value of the vehicle speed based on the wheel speed information (S102).

The indicated speed tolerance correcting apparatus 100 determines a tolerance value mapped to a speed section corresponding to the average value of the vehicle speed based on the tolerance value table shown in FIG. 2 and FIG. 3 (S103). In addition, the indicated speed tolerance correcting apparatus 100 may determine the tolerance value table by using a road type or a vehicle condition, and may determine upper and lower limits of the tolerance value in the tolerance value table based on GPS information.

Accordingly, the indicated speed tolerance correcting apparatus 100 calculates the indicated speed by adding the tolerance value to the vehicle speed (S104). For example, when the vehicle speed is 110, the indicated speed becomes 111.20 by adding 1.20, which is a middle value between the upper tolerance limit of 2.20 and the lower limit of 0.20 in the section 101 to 120, to the vehicle speed of no. In this case, the indicated speed tolerance correcting apparatus 100 may apply a different tolerance range for each road type.

Then, the indicated speed tolerance correcting apparatus 100 calculates a correction value based on the GPS-based actual speed (Sins). In this case, it is important that the indicated speed tolerance correcting apparatus 100 obtains the GPS-based actual speed in order to calculate an accurate correction value if possible.

Accordingly, the indicated speed tolerance correcting apparatus 100 obtains vehicle attitude information from the gyro sensor 220 to determine whether a vehicle attitude is in a horizontal state. In addition, the indicated speed tolerance correcting apparatus 100 obtains steering angle information from the steering angle sensor 210 to determine whether the vehicle moves straight. Accordingly, the indicated speed tolerance correcting apparatus 100 may increase reliability of the GPS information by acquiring the actual speed using GPS information received when the vehicle is in a straight and horizontal state.

The indicated speed tolerance correcting apparatus 100 may calculate a correction value by dividing a value obtained by subtracting the actual speed from the previous indicated speed into speed sections. In this case, the previous indicated speed indicates the indicated speed displayed on the cluster gauge.

The actual speed indicates the GPS-based actual speed of the vehicle.

The speed section is a section range of vehicle speed, and the speed section is 20 in the table of FIG. 4.

The indicated speed tolerance correcting apparatus 100 may correct the indicated speed by reflecting the correction value to the indicated speed (S106). That is, the indicated speed tolerance correcting apparatus 100 may calculate the current tolerance value by subtracting the correction value from the previous tolerance value, and may calculate the corrected indicated speed by adding the current tolerance value to the vehicle speed.

Then, the indicated speed tolerance correcting apparatus 100 may display the corrected indicated speed (S107), and may share correction values for a same vehicle model and a same specification through communication with surrounding vehicles to supplement the correction value table (S108).

In this case, the correction value table may be stored as illustrated in FIG. 4, and an example in which correction is performed 10 times is illustrated in FIG. 4.

As such, according to embodiments of the present invention, it is possible to increase customer satisfaction by minimizing the error between the indicated speed and the vehicle speed due to tire tuning while satisfying the law that the indicated speed is higher than the vehicle speed, by correcting the indicated speed by applying the correction value of the corresponding vehicle speed section after setting the tolerance as the middle value of the tolerance range, collecting the reliable actual speed, and calculating the correction value in an initial shipment state of the vehicle. That is, according to embodiments of the present invention, it is possible to minimize the error between the indicated speed and the vehicle speed by correcting the tolerance value by calculating the actual speed of the vehicle based on reliable GPS information regardless of tire tuning.

Figure 7:
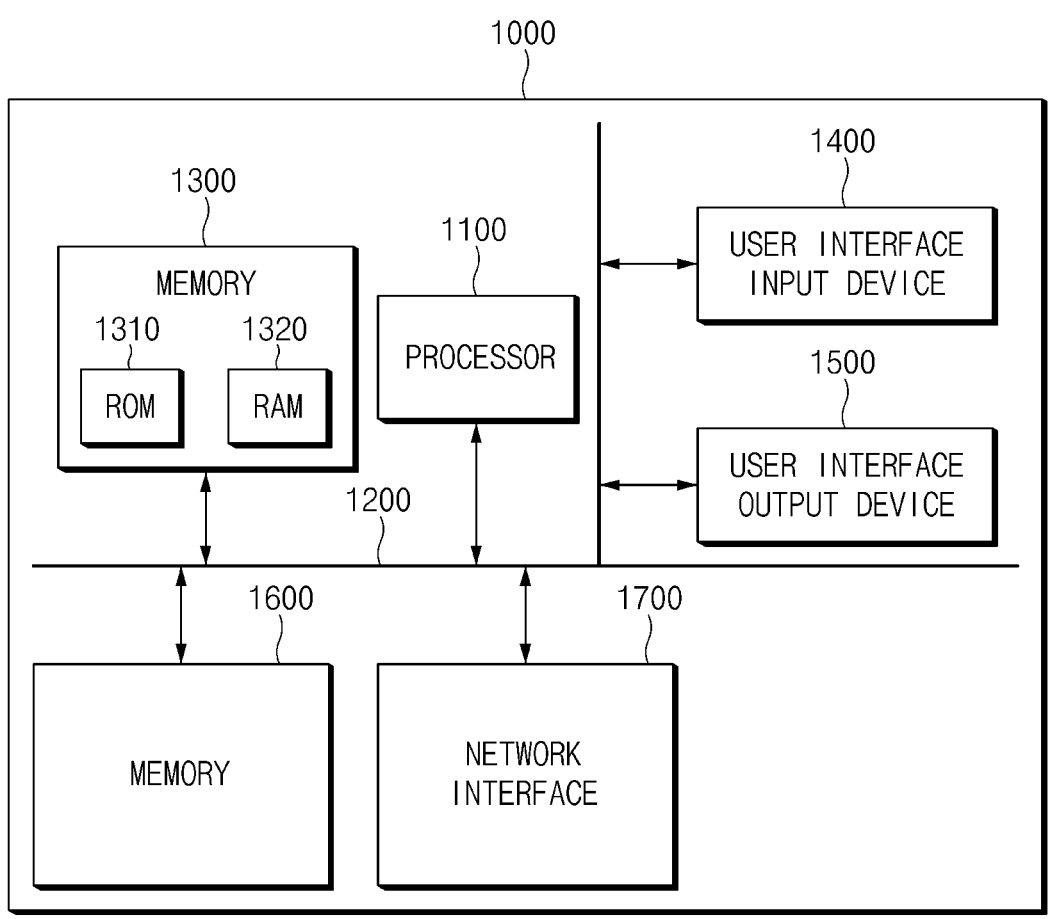
FIG. 7 illustrates a computing system according to an exemplary embodiment of the present invention.

FIG. 7 illustrates a computing system according to an exemplary embodiment of the present invention.

Referring to FIG. 7, the computing system 1000 includes at least one processor 1100 connected through a bus 1200, a memory 1300, a user interface input device 1400, a user interface output device 1500, and a memory (i.e., a storage) 1600, and a network interface 1700.

The processor 1100 may be a central processing unit (CPU) or a semiconductor device that performs processing on commands stored in the memory 1300 and/or the memory 1600. The memory 1300 and the memory 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the memory 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which the present invention pertains may make various modifications and variations without departing from the essential characteristics of the present invention.

Therefore, the exemplary embodiments disclosed in the present invention are not intended to limit the technical ideas of the present invention, but to explain them, and the scope of the technical ideas of the present invention is not limited by these exemplary embodiments. The protection range of the present invention should be interpreted by the claims below, and all technical ideas within the equivalent range should be interpreted as being included in the scope of the present invention.

What is claimed is:

1. An apparatus for correcting an indicated speed tolerance, the apparatus comprising:
   a global positioning system (GPS) receiver;
   a processor;

a memory coupled to the processor and storing instructions that, when executed by the processor, cause the processor to:
obtain, while a vehicle is being operated at a particular time, wheel speed information from a wheel speed sensor of the vehicle;
calculate, as a vehicle speed, an average wheel speed value based on the wheel speed information;
determine a tolerance value within a tolerance value range associated with a speed section, of a plurality of speed sections, to which the vehicle speed belongs;
calculate an indicated speed by using the tolerance value and the vehicle speed;
obtain, while the vehicle is being operated at the particular time and from a GPS receiver, GPS information associated with the vehicle;
determine an actual vehicle speed using the GPS information;
calculate a correction value using the actual vehicle speed, the indicated speed, and a speed section range; and
determine a corrected indicated speed based on the indicated speed and the correction value; and
a display device configured to display the corrected indicated speed.

2. The apparatus of claim 1, wherein the memory is further configured to pre-store a respective tolerance range for each speed section of the plurality of speed sections.

3. The apparatus of claim 1, wherein the instructions further cause the processor to vary the tolerance value range depending on a vehicle condition or a road type.

4. The apparatus of claim 1, wherein the instructions further cause the processor to calculate the actual vehicle speed based on the GPS information that is received in a straight state and in a horizontal state of the vehicle.

5. The apparatus of claim 4, wherein the instructions further cause the processor to collect steering angle information and vehicle attitude information to determine the straight state and the horizontal state of the vehicle.

6. The apparatus of claim 4, wherein the instructions further cause the processor to calculate the correction value by dividing a value obtained by subtracting the actual vehicle speed of the vehicle from the indicated speed by the speed section range.

7. The apparatus of claim 6, wherein the instructions further cause the processor to calculate a current tolerance value by subtracting the correction value from a previous tolerance value.

8. The apparatus of claim 7, wherein the instructions further cause the processor to calculate the corrected indicated speed by adding the current tolerance value to a current vehicle speed.

9. The apparatus of claim 1, wherein the corrected indicated speed is closer to the actual vehicle speed than the indicated speed.

10. The apparatus of claim 1, wherein the instructions further cause the processor to correct the indicated speed more than a predetermined number of times to approximate the actual vehicle speed.

11. The apparatus of claim 1, wherein the display device comprises a cluster.

12. An apparatus for correcting an indicated speed tolerance, the apparatus comprising:
a wheel speed sensor;
a global positioning system (GPS) receiver; and
an integrated speed tolerance correcting apparatus comprising a processor and configured to:
obtain, while a vehicle is being operated at a particular time, wheel speed information from the wheel speed sensor of the vehicle;
calculate, as a vehicle speed, an average wheel speed value based on the wheel speed information;
determine a tolerance value within a tolerance value range associated with a speed section, of a plurality of speed sections, to which the vehicle speed belongs;
calculate an indicated speed using the tolerance value and the vehicle speed;
obtain, while the vehicle is being operated at the particular time and from a GPS receiver, GPS information associated with the vehicle;
determine an actual vehicle speed using the GPS information;
calculate a correction value using the actual vehicle speed, the indicated speed, and a speed section range; and
determine a corrected indicated speed based on the indicated speed and the correction value; and
provide the corrected indicated speed to a display device,
wherein the display device is configured to display the corrected indicated speed.

13. The apparatus of claim 12, further comprising:
a steering angle sensor configured to sense information related to whether the vehicle travels straight ahead; and
a gyro sensor configured to sense attitude information of the vehicle.

14. A method for correcting an indicated speed tolerance, the method comprising:
obtaining, while a vehicle is being operated at a particular time, wheel speed information from a wheel speed sensor of the vehicle;
calculating, as a vehicle speed, an average wheel speed value based on the wheel speed information;
determining a tolerance value within a tolerance value range associated with a speed section, of a plurality of speed sections, to which the vehicle speed belongs;
calculating an indicated speed by using the tolerance value and the vehicle speed;
obtaining, while the vehicle is being operated at the particular time and from a GPS receiver, GPS information associated with the vehicle;
determining an actual vehicle speed using the GPS information;
calculating a correction value using the actual vehicle speed, the indicated speed, and a speed section range; and
determine a corrected indicated speed based on the indicated speed and the correction value; and
displaying the corrected indicated speed.

15. The method of claim 14, further comprising pre-storing a respective tolerance range for each speed section of the plurality of speed sections.

16. The method of claim 14, further comprising calculating the actual vehicle speed calculated based on the GPS information that is received in a straight state and in a horizontal state of the vehicle.

* * * * *